July 30, 1935.　　　F. J. CORRIGAN　　　2,009,766
PISTON AND PISTON RING STRUCTURE
Filed Oct. 24, 1934
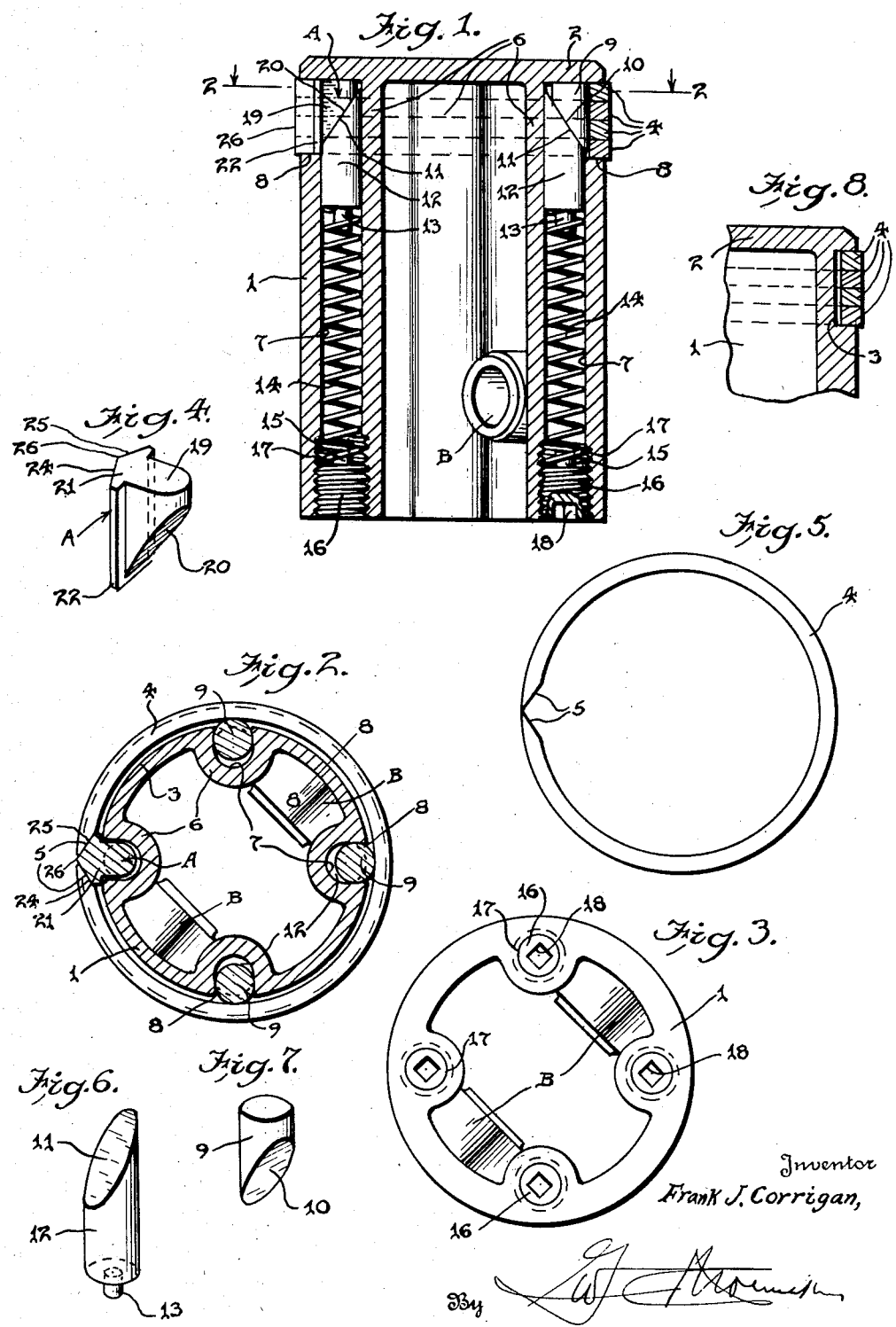
Inventor
Frank J. Corrigan,
By
Attorney Patented July 30, 1935

2,009,766

UNITED STATES PATENT OFFICE 2,009,766

PISTON AND PISTON RING STRUCTURE

Frank James Corrigan, Rochester, N. Y., assignor of one-fourth to Erwin Freiburger, Rochester, N. Y.

Application October 24, 1934, Serial No. 749,833

5 Claims. (Cl. 309—37)

This invention relates to a piston and piston ring structure.

One object of the invention is to provide a piston and piston ring structure for internal combustion engines, embodying among other characteristics, means whereby the rings may be effectively expanded and adjusted to compensate for wear and maintain a permanent seal irrespective of heat conditions and to reduce the usual wear on the rings carried by the piston.

Another object resides in the provision of a piston and piston ring mounting for internal combustion engines and means for expanding the piston rings and adjustment according to piston and cylindrical wear and providing for a positive and permanent seal, eliminating oil pumping past the rings and obviating the use of oil-control rings as well as the elimination of turning of the rings on the piston, increasing compression and thereby affording increased power and saving in the cost of repairs.

A still further object of the invention resides in the provision of a piston and piston ring mounting and expansion thereof with the parts associated together in a manner that in the event of piston slap the piston slap may be remedied readily by easy adjustment, obviating replacement of piston or piston rings or the use of piston skirt expanders, resulting in economy of engine operating costs.

With these and other objects in view, the invention consists in the construction and novel combination and arrangement of parts hereinafter fully described, illustrated in the accompanying drawing and pointed out in the claims hereto appended, it being understood that various changes in the form, proportion and minor details of construction, within the scope of the claims, may be resorted to without departing from the spirit or sacrificing any of the advantages of the invention.

In the drawing:—

Fig. 1 is a longitudinal sectional view illustrating an embodiment of my invention.

Fig. 2 is a transverse sectional view on the line 2—2 of Fig. 1.

Fig. 3 is a bottom plan view.

Fig. 4 is a detail perspective view of the ring gap compensator.

Fig. 5 is a plan view of one of the piston rings.

Fig. 6 is a view of one of the pusher elements.

Fig. 7 is a view of one of the ring expanding elements.

Fig. 8 is a sectional view on the line 8—8 of Fig. 2.

Referring now more particularly to the accompanying drawing, the reference character 1 indicates a hollow cylindrical body or skirt of the piston having a head 2 and an annular groove 3 adjacent the underside of the head 2 for the reception of a plurality of split piston rings 4, all alike in form, and having beveled ends 5 at their split portions. One or more rings may be employed.

The body or skirt 1 and the head may be composed of any suitable material and the body has a plurality of equi-distantly spaced inwardly directed lengthwise ribs 6 which are provided with longitudinally disposed bores 7, the ribs and the bores extending from the underside of the head 2 to the opposite end of the body or skirt 1, as shown particularly in Fig. 1. Each bore has a short slot 8 adjacent the head 2. These slots 8 are formed alike and aline with the groove 3 and the rings 4 are mounted in the groove 3 and extend over the slots 8. These rings may be formed of any suitable material.

To maintain the piston rings 4 in the groove 3 and effective operative contact with the cylindrical wall of an external or internal combustion cylinder (not shown), I provide a highly satisfactory means to normally force the piston rings outwardly of the body or skirt 1 in uniform relation one piston ring to another. One means for this purpose, may reside in the employment of cooperating expanding elements and coacting push elements between each set of which, and an adjusting screw, expansible springs are employed to act upon the push elements to normally force the expanding elements outwardly against the inner walls of the piston rings to effectively present the outer side walls of the piston rings to the cylinder wall. For instance, in three of the aforesaid bores 7, I dispose preferably cylindrical shaped expanding elements 9 having beveled inner ends 10 with which are engaged the beveled outer ends 11 of the respective push elements 12. These elements 9 and 10 may be formed preferably of material not affected by normal piston heat. They may be formed of hardened steel, but any suitable material may be employed and the abutting ends of the expanding and push elements may be beveled or formed otherwise than as shown.

Each push element 12 may have a reduced end or projection 13 adapted to fit into the upper end of the respective coiled spring 14 arranged in the respective bore 7. The lower end of the respective spring 14 may fit around a reduced portion 15 of an exteriorly, preferably right hand threaded adjusting screw 16 which has screw threaded engagement with an interior screw threaded portion 17 at the outer end of the respective bore 7. By virtue of the screw threaded connection of these adjusting screws 16 with the screw threaded portions 17 of the respective bores 7, the adjusting screws preferably having a rectangular wrench-receiving socket 18, the tension of the springs 14 may be readily varied so as to adjust or condition the springs 14 for effective action on the push elements 12 to provide for an effective outward expanding action of the expanding elements 9.

The springs expand and exert pressure on the push elements 12 against the inner ends 10 of the expanding elements 9, and the expanding elements having their outer ends bearing against the underside of the head 2 of the piston body or skirt, the expanding elements are forced outwardly radially of the piston body to effectively expand the piston rings 4 as will be readily understood from the foregoing.

In the remaining bore 7, I mount the same type of spring 14 and provide the same type of adjusting screw 16 and the same type of push element 12 but the expanding element A in this remaining bore is of a shape different from the shape of the other three expanding elements 9. For instance, in this remaining bore the expanding element A is shown particularly in Fig. 4 and consists of a body portion 19 having a beveled portion 20 adapted to coact with the corresponding beveled portion of the respective push element 12, as shown in Fig. 1, and it also has projecting from the body 19 a wedge shaped portion 21 that has diverging wedge faces 24 and 25, resulting in substantially a knife edge 26, and which is adapted to lie preferably in true circumferential relation with the piston rings 4 with the wedge faces 24 and 25 abutting the beveled edges 5 of the respective piston rings, thereby expanding the rings circumferentially and filling the gap between the separated ends of the piston rings. This ring gap compensator A compensates for increased gap that is due to normal wear of piston rings so as to seal all ring gap. It may be formed of common gray iron or cast iron or any other suitable material of a nature calculated not to score the cylinder. It will thus be appreciated that I provide for a radial or lateral expansion of the rings through the instrumentality of the expanding elements 9 and A and by virtue of the wedge shaped expanding element A I also provide for a circumferential expansion of the piston rings.

While perhaps unnecessary to illustrate, there is shown a pair of bosses B (Fig. 1) to receive a wrist pin (not shown).

By virtue of the fact that the springs 14 directly engage, at one end, the tension adjusting screws, the springs tend to hold the screws 16 in adjusted position against loosening. Furthermore, since the head 2 of the piston is closed and the pusher elements 12 are elongated as shown, with their spring engaging ends substantially remote from the head 2, the pusher actuating springs 14 are well protected from the excessive heat of the explosions, in practice, upon the head of the piston, and will retain their temper and necessary elasticity for an indefinite period.

The result is an inexpensive, simple, economical and effective piston and piston ring structure in which the piston rings may be easily and readily positioned or removed or adjusted in the event of wear on the rings or engine cylinder and in which an effective seal is provided to prevent pumping of oil past the rings and in which the use of oil-control rings is obviated. The further result is that compression is increased and greater power given the engine by reason of the increased compression. The adjustment of the ring expansion means enables quick remedy of piston slap and insures even wear of the engine cylinder wall. These features and advantages reduce operating costs, and consequently, prolong the life of the engine, insuring economy. The operating means for the expansion of the springs being confined within the cylindrical wall of the piston insures compactness of structure.

What is claimed is:—

1. A piston for internal combustion engines comprising a cylindrical body having a solid head and an annular groove in the side wall thereof adjacent the head and also having a plurality of equi-distantly spaced longitudinal bores in the side wall thereof extending the length of the piston and closed at one end by the head, each bore having a slot therein intersecting with the said groove, split piston rings mounted in said groove and extending across the slots of the bores, the opposite ends of said bores being interiorly screw threaded, an expanding element mounted in each bore adjacent the respective slot for lateral movement against the rings, the several expanding elements simultaneously contacting circumferentially spaced points of all of the rings, each expanding element having a beveled inner end, an adjusting screw mounted in the interiorly screw threaded end of each of said bores, an elongated pusher element mounted in each bore and having a beveled end coacting with the beveled end of the respective beveled expanding element, and an expansible spring in each bore between its pusher element and its adjusting screw, said springs, exerting pressure on the expanding elements to force the expanding elements outwardly to expand the rings.

2. A piston for internal combustion engines comprising a cylindrical body having a solid head and an annular groove in the side wall thereof adjacent the head and also having a plurality of equi-distantly spaced longitudinal bores in the side wall thereof extending the length of the piston and closed at one end by the head, each bore having a slot therein intersecting with the said groove, split piston rings mounted in said groove and extending across the slots of the bores, the opposite ends of said bores being interiorly screw threaded, an expanding element mounted in each bore adjacent the respective slot for lateral movement against the rings, the several expanding elements simultaneously contacting circumferentially spaced points of all of the rings, each expanding element having a beveled inner end, an adjusting screw mounted in the interiorly screw threaded end of each of said bores, an elongated pusher element mounted in each bore and having a beveled end coacting with the beveled end of the respective beveled expanding element, and an expansible coiled spring in each bore between its pusher element and its adjusting screw, said springs exerting pressure on the expanding elements to force the expanding elements outwardly to expand the rings, one of said expanding elements having a wedge shaped portion engaging the opposite ends of all of the split rings and filling the gap between the ends of the rings and also exerting a circumferential expansion on the rings, and compensating any increased gap that is due to normal wear of piston rings, thus effectively sealing all ring gaps at the split of the rings.

3. A piston for internal combustion engines comprising a cylindrical body having a solid head and an annular groove in the side wall thereof adjacent the head and also having a plurality of bores in the side wall thereof extending the length of the piston, each bore having a slot therein intersecting with the said groove, split piston rings mounted in said groove and extending across the slots of the bores, an expanding element mounted in the several expanding elements simultaneously contacting circumferentially spaced points of all of the rings, each bore for movement through the respective slot, an elongated pusher element mounted in each bore and engaging the respective expanding element, and a spring in each bore yieldably acting against the respective pusher element at a point remote from the piston head to force the engaging expanding element outwardly of the respective slot into engagement with the piston rings to force the latter normally outwardly.

4. A piston for internal combustion engines comprising a cylindrical body having a solid head and an annular groove in the side wall thereof adjacent the head and also having a plurality of bores in the side wall thereof extending the length of the piston, each bore having a slot therein intersecting with the said groove, split piston rings mounted in said groove and extending across the slots of the bores, an expanding element mounted in the several expanding elements simultaneously contacting circumferentially spaced points of all of the rings, each bore for movement through the respective slot, an elongated pusher element mounted in each bore and engaging the respective expanding element, a spring in each bore yieldably acting against the respective pusher element at a point remote from the piston head to force the engaging expanding element outwardly of the respective slot into engagement with the piston rings to force the latter normally outwardly, and means for adjusting the tension of said springs.

5. A piston for internal combustion engines comprising a cylindrical body having an imperforate head and an annular groove in the side wall thereof immediately beneath the head and also having a plurality of equi-distantly spaced longitudinal bores in the side wall thereof, each bore having a slot therein intersecting with the said groove, a series of superimposed split piston rings mounted in said groove and extending across the slots of the bores, the outer ends of said bores being interiorly screw threaded, an expanding element mounted in each bore adjacent the respective slot having its outer end abutting the piston head, each expanding element having a beveled inner end, the several expanding elements simultaneously contacting circumferentially spaced points of all the rings, an adjusting screw mounted in the interiorly screw threaded end of each of said bores, a pusher element mounted in each bore and having a beveled end coacting with the beveled end of the respective beveled expanding element, and an expansible spring in each bore exerting pressure on the pusher elements to force the expanding elements bodily at right angles to their axes and outwardly against the several rings, said adjusting screws being right hand threaded rings, to apply expanding pressure simultaneously against the several rings at several points in their circumference.

FRANK JAMES CORRIGAN.

CERTIFICATE OF CORRECTION.

Patent No. 2,009,766.                         July 30, 1935.

FRANK JAMES CORRIGAN.

It is hereby certified that error appears in the printed specification of the above numbered patent requiring correction as follows: Page 3, first column, lines 17-18, and 38-39, claims 3 and 4 respectively, strike out the words "each bore for movement through the respective slot," and insert the same after "in" in lines 15 and 36, of said claims; and second column, lines 35 and 36, claim 5, strike out the words "said adjusting screws being right hand threaded rings,"; and that the said Letters Patent should be read with these corrections therein that the same may conform to the record of the case in the Patent Office.

Signed and sealed this 17th day of September, A. D. 1935.

(Seal)                                                                     Leslie Frazer
                                                                  Acting Commissioner of Patents.